US012693779B2

(12) United States Patent
Sivakumar et al.

(10) Patent No.: US 12,693,779 B2
(45) Date of Patent: Jul. 28, 2026

(54) TRAINING AND USING A SENTIMENT MACHINE LEARNING MODULE TO RECEIVE AS INPUT HAPTIC METRIC VALUES TO DETERMINE A SENTIMENT SCORE FOR TEXT TO PROVIDE TO AN INTERACTIVE PROGRAM

(71) Applicant: INTERNATIONAL BUSINESS MACHINES CORPORATION, Armonk, NY (US)

(72) Inventors: Gandhi Sivakumar, Bentleigh (AU); Kushal S. Patel, Pune (IN); Sarvesh S. Patel, Pune (IN); Jianbin Tang, Doncaster East (AU)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 17/823,514

(22) Filed: Aug. 30, 2022

(65) Prior Publication Data
US 2024/0069717 A1     Feb. 29, 2024

(51) Int. Cl.
G06F 3/04883     (2022.01)
G06F 40/20     (2020.01)
(52) U.S. Cl.
CPC .......... G06F 3/04883 (2013.01); G06F 40/20 (2020.01)
(58) Field of Classification Search
None
See application file for complete search history.

(56) References Cited

U.S. PATENT DOCUMENTS 8,059,104 B2    11/2011   Shahoian et al.
8,095,104 B2    1/2012    Kawae et al.
8,447,144 B2    5/2013    King et al.
(Continued)

FOREIGN PATENT DOCUMENTS

KR    20150118813 A    4/2014

OTHER PUBLICATIONS

Kolakowska et al. "A Review of Emotion Recognition Methods Based on Data Acquired via Smartphone Sensors", Nov. 8, 2020.*
(Continued)

*Primary Examiner* — Paras D Shah
*Assistant Examiner* — Nicholas D Lowen
(74) *Attorney, Agent, or Firm* — Konrad Raynes Davda & Victor LLP; David Victor

(57)     ABSTRACT

Provided are a computer program product, system, and method for training and using a sentiment machine learning module to determine a sentiment score. Haptic metric values are collected from haptic interfaces embedded in input devices users control to generate content. A training set associates a haptic metric value resulting from a user interacting with an input device to generate content and a sentiment score for the content. A sentiment machine learning module is trained to output the sentiment score in a training set from input comprising the haptic metric value. A haptic metric value received from an input device, used by an active user interacting with the interactive program, is inputted to the sentiment machine learning module to output a haptic sentiment score for the haptic metric value. The haptic sentiment score is provided to an interactive program to control the interactive program communications with the active user.

20 Claims, 6 Drawing Sheets

(56)         References Cited

U.S. PATENT DOCUMENTS

| | | | |
|---|---|---|---|
| 10,522,143 B2 * | 12/2019 | Chandrasekaran et al. ................. G09B 5/00 |
| 10,878,308 B2 * | 12/2020 | Biswas et al. ........... G06N 3/02 |
| 11,604,979 B2 * | 3/2023 | Baughman et al. ... G06N 3/045 |
| 2013/0063256 A1 | 3/2013 | Tartz et al. |
| 2014/0253303 A1 | 9/2014 | Levesque |
| 2014/0279050 A1 | 9/2014 | Makar et al. |
| 2015/0235240 A1 | 8/2015 | Chang et al. |
| 2015/0293592 A1 | 10/2015 | Cheong et al. |
| 2020/0168205 A1 | 5/2020 | Rakshit et al. |
| 2024/0047155 A1 * | 2/2024 | Huffman et al. ...... H01H 13/84 |

OTHER PUBLICATIONS

"AI for Business Automation", IBM Corporation, pp. 6, [online][retrieved Aug. 1, 2022] https://research.ibm.com/topics/ai-for-business-automation.

D. Ajayi, et al., "Solving common challenges in sentiment analysis with help from Project Debater", Watson Blog, Aug. 10, 2020, pp. 7, [online][retrieved Aug. 7, 2022] https://www.ibm.com/blogs/watson/2020/08/solving-common-challenge . . . .

Anonymous, "Sentiment Driven Haptic Keyboard Effects", ip.com, IP.com No. IPCOM000251602D, Nov. 15, 2017, pp. 4.

C. Chinnook, "Are Haptics the Next Big Thing for Mobile Devices?", Insight Media, May 15, 2019, [online][retrieved Aug. 1, 2022] https://www.insightmedia.info/are-haptics-the-next-big-thing-for-mobil . . . , pp. 7.

"Customer sentiment: What it is, why it matters, and how to measure it", Bazaarvoice Blog, Jan. 13, 2022, pp. 21, [online][retrieved Aug. 1, 2022] https://www.bazaarvoice.com/blog/customer-sentiment-what-it-is-why- . . . .

S. Ghosh, et al., "Emotion detection from touch interactions during text entry on smartphones", Elsevier, International Journal of Human-Computer Studies 130 (2019) 47-57, Apr. 17, 2019, pp. 11.

A. Kapoor, "Sentiment Analysis Enhancing Your Virtual Assistant's Emotional Intelligence", Chatsbots Journal, Dec. 17, 2020, pp. 9, [online][retrieved Aug. 1, 2022] https://chatbotsjournal.com/sentiment-analysis-enhancing-your-virtual-a . . . .

T. Pattilachan, "How AI and Haptics Could Revolutionize VR Gaming", Sep. 23, 2019, pp. 12, [online][retrieved Aug. 1, 2022] https://vrscout.com/news/how-ai-and-haptics-could-revolutionize-vr/.

M. Stsiopkina, "Sentiment Analysis to Understand Customer Behaviour Oxylabs", Oxylabs, Oct. 10, 2022, pp. 18, [online][retrieved] https://oxylabs.io/blog/sentiment-analysis.

"Tactile Feedback in Mobile: Consumer Attitudes About High-Definition Haptic Effects in Touch Screen Phones", immersion, Aug. 2017, pp. 17.

D. Tsetserukou, et al., "Affective haptics in emotional communication", Research Gate, Oct. 2009, pp. 7.

* cited by examiner

Collected User Sentiment Info

Deviation Training Value $(D_{i,\ SS,\ SC})$

Deviation Value $(D_{SC})$

Training Set

Input to Machine Learning Module

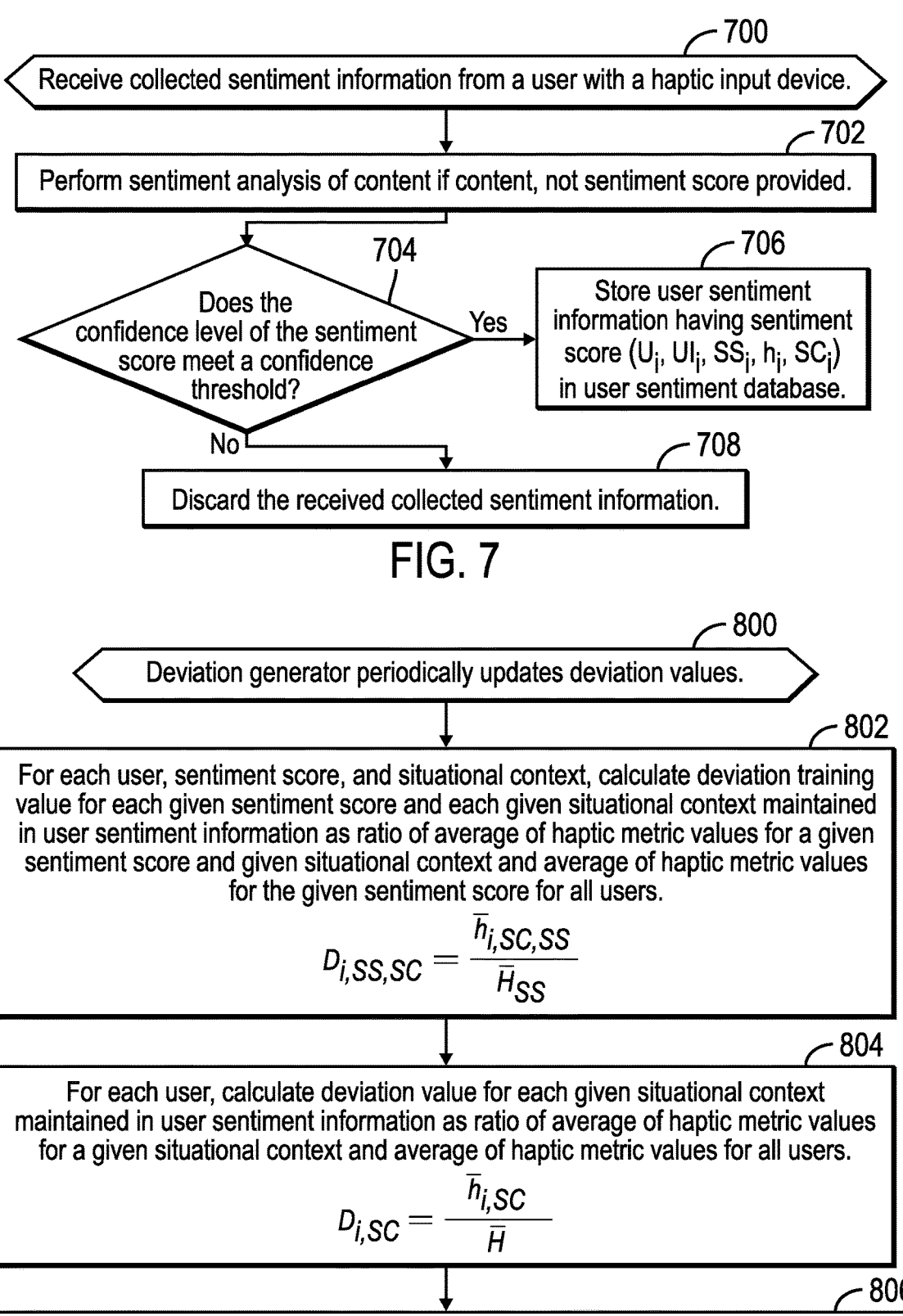

700

Receive collected sentiment information from a user with a haptic input device.

702

Perform sentiment analysis of content if content, not sentiment score provided.

704

Does the confidence level of the sentiment score meet a confidence threshold?

Yes

706

Store user sentiment information having sentiment score ($U_i$, $UI_i$, $SS_i$, $h_i$, $SC_i$) in user sentiment database.

No

708

Discard the received collected sentiment information.

Deviation generator periodically updates deviation values.

802

For each user, sentiment score, and situational context, calculate deviation training value for each given sentiment score and each given situational context maintained in user sentiment information as ratio of average of haptic metric values for a given sentiment score and given situational context and average of haptic metric values for the given sentiment score for all users.

$$D_{i,SS,SC} = \frac{\overline{h_{i,SC,SS}}}{\overline{H_{SS}}}$$

804

For each user, calculate deviation value for each given situational context maintained in user sentiment information as ratio of average of haptic metric values for a given situational context and average of haptic metric values for all users.

$$D_{i,SC} = \frac{\overline{h_{i,SC}}}{\overline{H}}$$

806

Store calculated deviation training values and deviation values in user deviation database.

FIG. 8

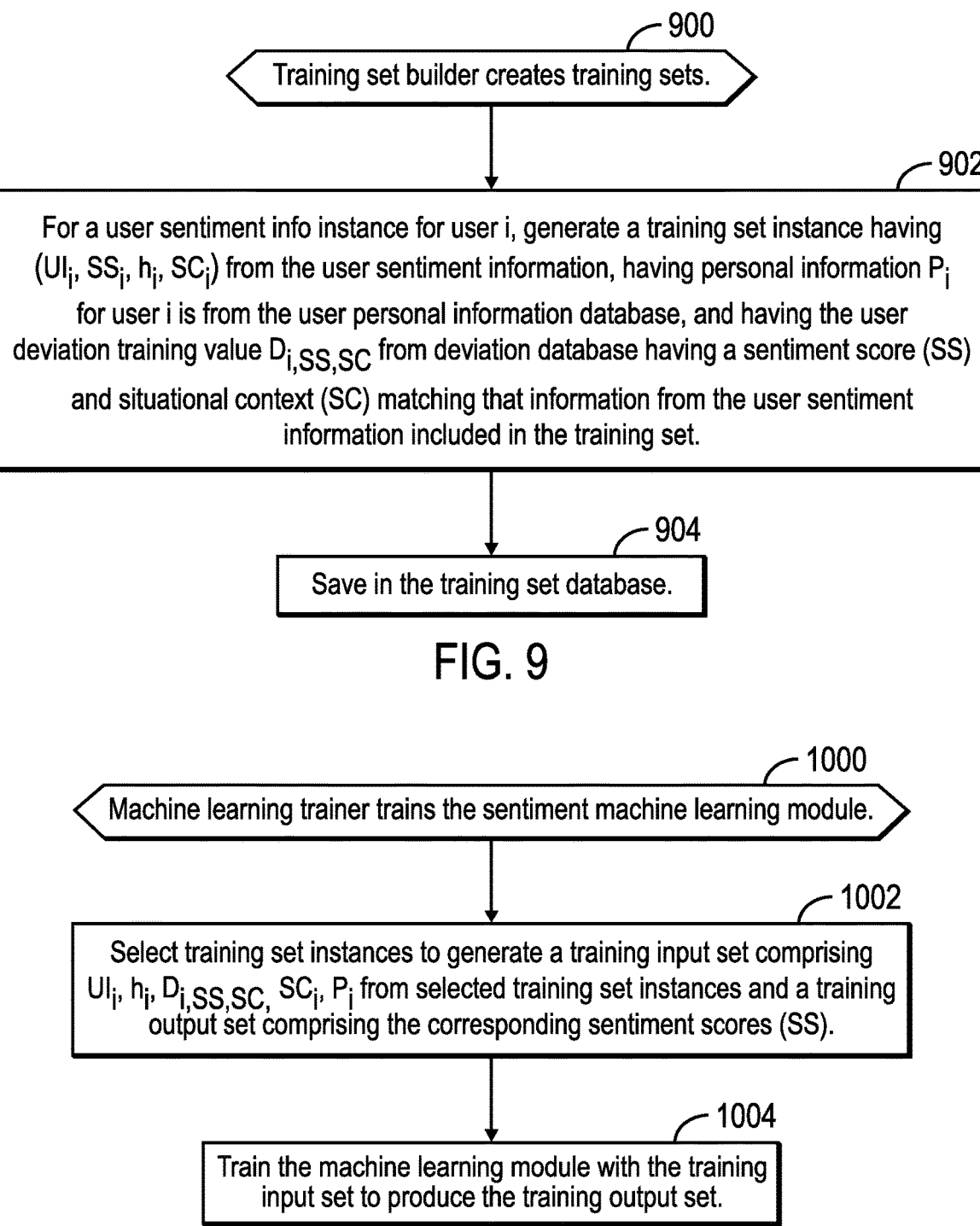

900

Training set builder creates training sets.

902

For a user sentiment info instance for user i, generate a training set instance having $(UI_i, SS_i, h_i, SC_i)$ from the user sentiment information, having personal information $P_i$ for user i is from the user personal information database, and having the user deviation training value $D_{i,SS,SC}$ from deviation database having a sentiment score (SS) and situational context (SC) matching that information from the user sentiment information included in the training set.

904

Save in the training set database.

Machine learning trainer trains the sentiment machine learning module.

1002

Select training set instances to generate a training input set comprising $UI_i, h_i, D_{i,SS,SC}, SC_i, P_i$ from selected training set instances and a training output set comprising the corresponding sentiment scores (SS).

1004

Train the machine learning module with the training input set to produce the training output set.

FIG. 10

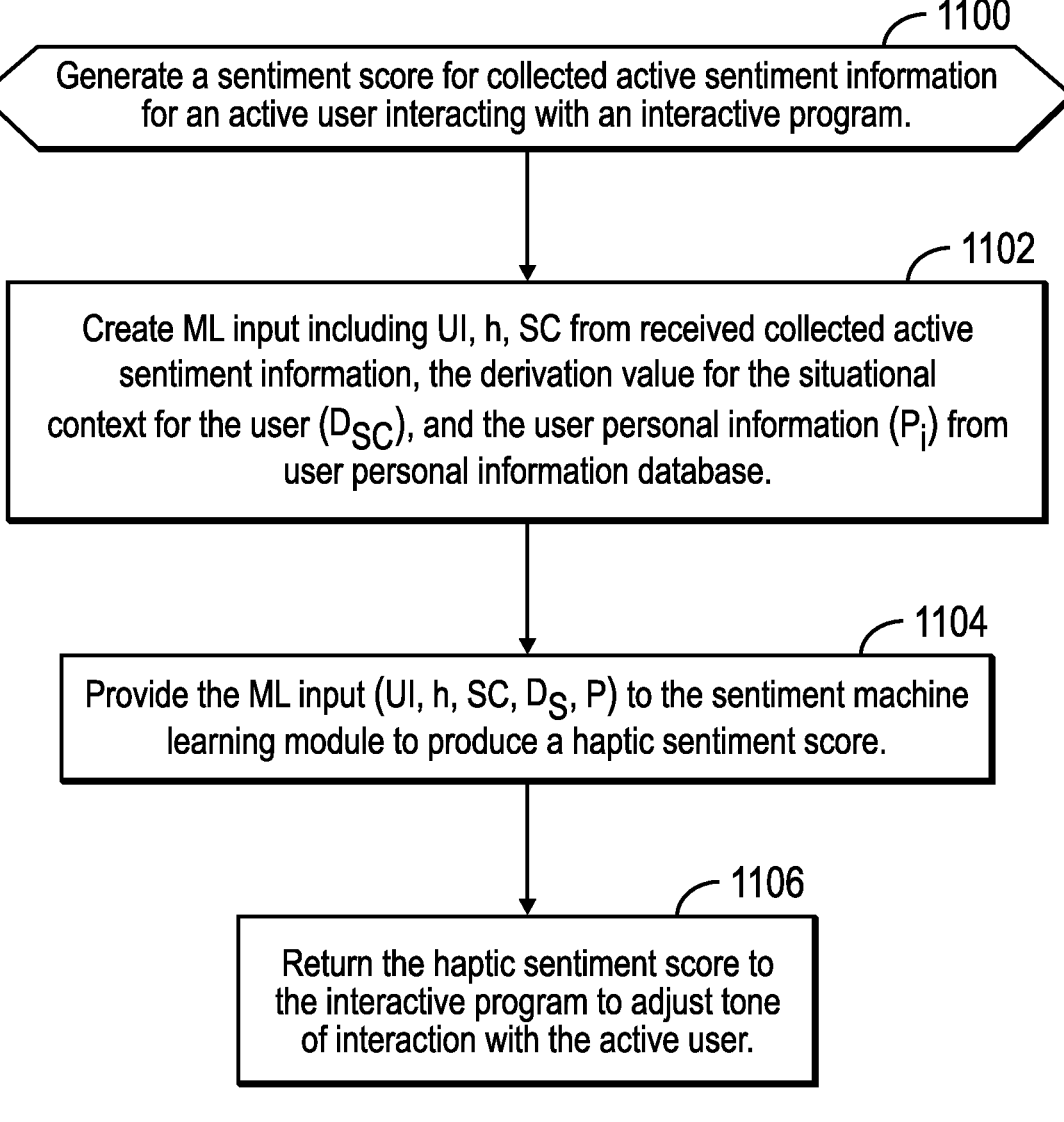

1100

Generate a sentiment score for collected active sentiment information for an active user interacting with an interactive program.

1102

Create ML input including UI, h, SC from received collected active sentiment information, the derivation value for the situational context for the user ($D_{SC}$), and the user personal information ($P_i$) from user personal information database.

1104

Provide the ML input (UI, h, SC, $D_S$, P) to the sentiment machine learning module to produce a haptic sentiment score.

1106

Return the haptic sentiment score to the interactive program to adjust tone of interaction with the active user.

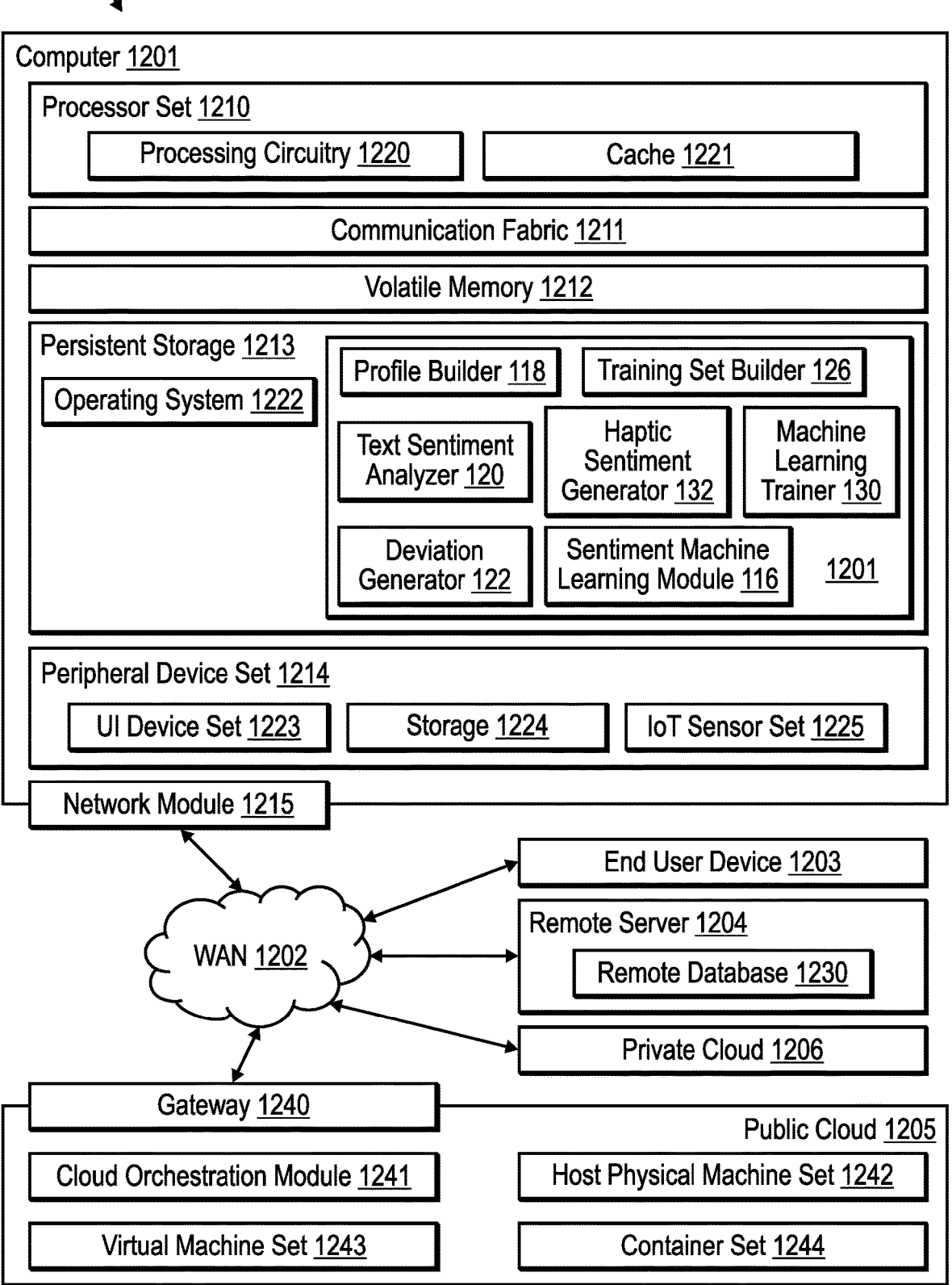

Computer 1201

Processor Set 1210

Processing Circuitry 1220          Cache 1221

Communication Fabric 1211

Volatile Memory 1212

Persistent Storage 1213

Operating System 1222

Profile Builder 118          Training Set Builder 126

Text Sentiment Analyzer 120

Haptic Sentiment Generator 132

Machine Learning Trainer 130

Deviation Generator 122

Sentiment Machine Learning Module 116

1201

Peripheral Device Set 1214

UI Device Set 1223          Storage 1224          IoT Sensor Set 1225

Network Module 1215

End User Device 1203

WAN 1202

Remote Server 1204

Remote Database 1230

Private Cloud 1206

Gateway 1240

Cloud Orchestration Module 1241

Virtual Machine Set 1243

Public Cloud 1205

Host Physical Machine Set 1242

Container Set 1244

FIG. 12

TRAINING AND USING A SENTIMENT MACHINE LEARNING MODULE TO RECEIVE AS INPUT HAPTIC METRIC VALUES TO DETERMINE A SENTIMENT SCORE FOR TEXT TO PROVIDE TO AN INTERACTIVE PROGRAM

BACKGROUND OF THE INVENTION

1. Field of the Invention

The present invention relates to a computer program product, system, and method for training and using a sentiment machine learning module to receive as input haptic metric values to determine a sentiment score for text to provide to an interactive program.

2. Description of the Related Art

Sentiment analysis is a subset of natural language processing (NLP) capabilities that provides high level filters for users when exploring and evaluating data. Sentiment analysis of user entered text is used to construct an enhanced perspective on customer experiences and the voice of the customer. Sentiment analysis may be used to determine customer attitudes toward their brands and their buying experiences. This sentiment analysis helps companies identify trends. Sentiment analysis may also be used to deliver improved customer experiences and allow a virtual assistant program to determine the customer emotion to control how the virtual assistant or bot can respond to deal with sentiments and emotions of anger to improve the customer experience.

There is a need in the art to provide improved techniques for determining a sentiment score for users.

SUMMARY

Provided are a computer program product, system, and method for training and using a sentiment machine learning module to receive as input haptic metric values to determine a sentiment score for text to provide to an interactive program. Received haptic metric values are collected from haptic interfaces embedded in input devices users are controlling to generate content having associated sentiment scores. Training sets are formed. A training set associates a haptic metric value resulting from a user interacting with an input device to generate content and a sentiment score for the content produced when the haptic metric value was measured from the input device. For a selected training of the training sets, a sentiment machine learning module is trained to output the sentiment score in the selected training set from input comprising the haptic metric value. A haptic metric value received from an input device, used by an active user interacting with the interactive program, is inputted to the sentiment machine learning module to output a haptic sentiment score for the haptic metric value. The haptic sentiment score is provided to the interactive program to control the interactive program communications with the active user.

BRIEF DESCRIPTION OF THE DRAWINGS

FIG. 7 illustrates an embodiment of operations to process received collected sentiment information from a user with a haptic input device.

FIG. 8 illustrates an embodiment of operations to generate deviation values for users indicating a relation of user haptic metric values association with a sentiment score to a baseline association of haptic metric values to sentiment scores across users.

FIG. 9 illustrates an embodiment of operations to create training sets used to train the sentiment machine learning module.

FIG. 10 illustrates an embodiment of operations to train the sentiment machine learning module.

FIG. 11 illustrates an embodiment of operations to use the sentiment machine learning module to generate a sentiment score for collected active sentiment information for an active user interacting with an interactive program.

FIG. 12 illustrates a computing environment in which the components of FIG. 1 may be implemented.

DETAILED DESCRIPTION

Figure 1:
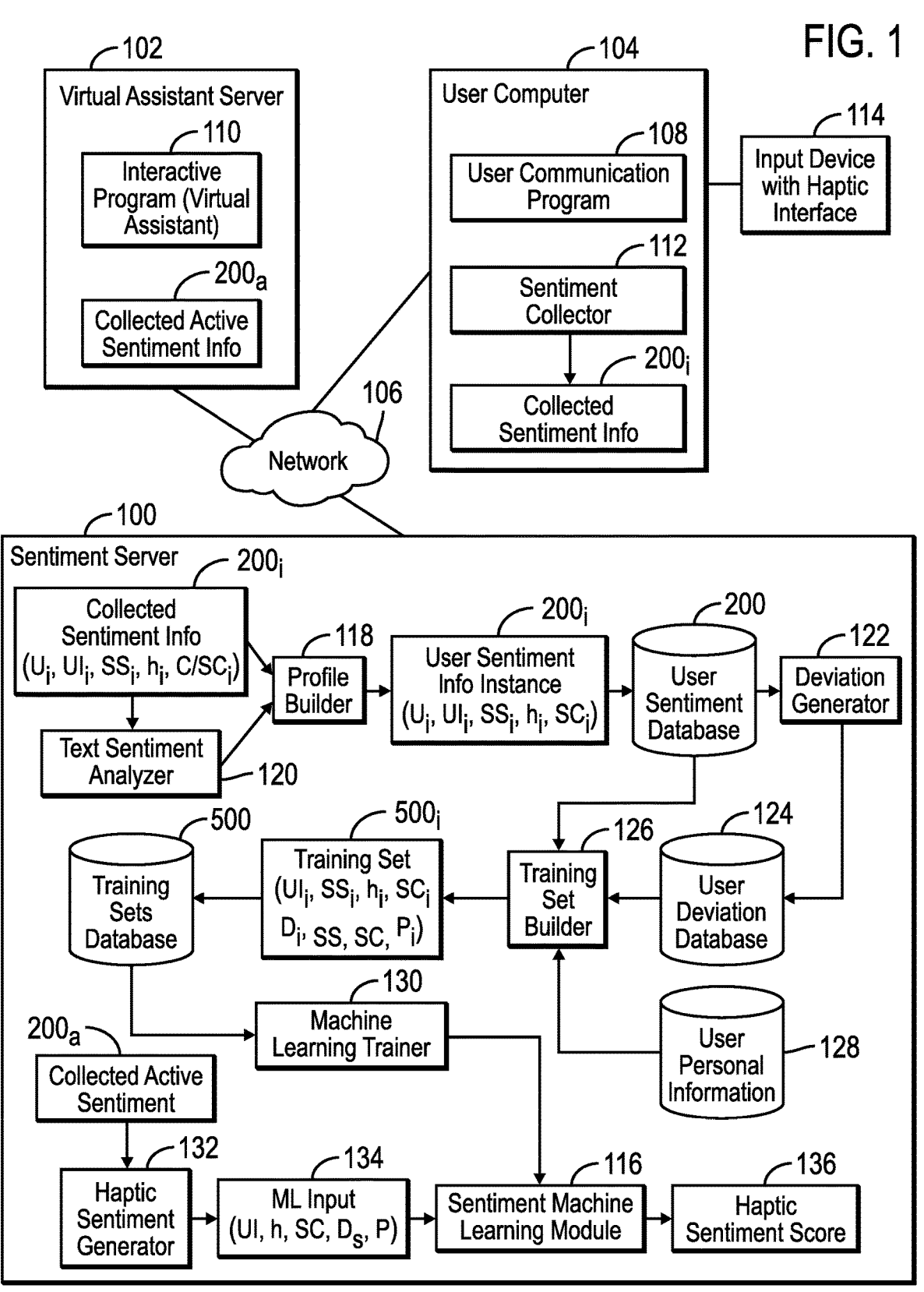
FIG. 1 illustrates an embodiment of a computing environment in which sentiment scores are determined based on haptic metric values resulting from a user generating content.

Described embodiments provide haptic information, collected from a user interacting with an input device having a haptic interface, such as a keyboard, to incorporate into the sentiment analysis to provide an improved sentiment score value for a user generating content. With described embodiments, user haptic metric values are collected when the user enters text, along with other information such as situational context, and a sentiment score determined from analysis of the content the user entered. This information may then be used to train a sentiment machine learning module to use the haptic metric values along with other information to determine the user sentiment score. This enhanced sentiment score may then be provided to an interactive program, such as a virtual assistant, for use in controlling the tone and content the virtual assistant presents to the user based on their current sentiment or emotional state.

With described embodiments, information collected from tactile interfaces may be supplemented with the personality insights and situational and time context to provide improved sentiment scores with better confidence values. Information on user habits and personal information from a personality insights database may further supplement the information used in the sentiment analysis. To allow the sentiment analyzer to collect the personality and personal identification information (PII), the user must consent. Once the consent is received, the profile builder process polls for events and gathers the information about pressure, tactile interface touch information and associates this haptic information with the relational attributes of the personality for the user. Further, deviation values may be determined to compare a user's haptics for different sentiment scores with all the users to determine a measure of a user's haptic metric values relative to all other users for different sentiment scores. The deviation values may be used to weight the sentiment score based on the user specific haptic profile.

If a sentiment score cannot be determined with a high confidence from content the user is generating while producing the haptic metric values, then the haptic metric values cannot be considered as predictive of a particular user emotional state or sentiment. In case the user is typing some common text, which has no words indicating the anger or sadness, and these high-pressure keystrokes have no values that confirm a specific sentiment. Haptics collected under such circumstances are not retained for use in training a sentiment machine learning module. This information on the user haptics and concurrently determined sentiments is used to form a user driven ground truth to understand the emotional behavior of the user. Deviations in haptic measurement for sentiment scores between a given user and a collective of users are used to determine deviation values that may be further used as input to the sentiment machine learning module to determine sentiment scores for a user's measured haptic values.

When any computation job is submitted to compute a runtime emotional state of the user, then the sentiment machine learning module considers the haptic values, situational context, a personalized sentiment deviation factor for the user, and personal information for the user to determine a sentiment score. The sentiment score may be provided to a virtual agent to allow the virtual agent to provide improved tone and content to better service customers and their experiences based on their calculated sentiment score reflective of current sentiment and emotional state.

Described embodiments provide improved sentiment analysis by considering user gestures and physical manipulations of the user interface and keyboard as a further accurate indicator of emotions. For instance, people type faster and harder when they are upset and frustrated, and slower and easier when they are relaxed. Applications that are dependent on the emotional state of the person for determining how to interact with the person will benefit by improved determinations of sentiment states that consider haptics feedback and the nature of pressure, touch, and access pattern of advanced cognitive systems.

FIG. 1 illustrates an embodiment of a sentiment server 100 in communication with a virtual assistant server 102 and multiple user computers 104 over a network 106, although only one user computer 104 is shown. The user computers 104 include a user communication program 108, such as an email program, text message program, social media program, chat box, video or image sharing application, etc., to communicate with an interactive program 110, such as a virtual assistant. In further embodiments, the interactive program 110 may be located on the user computer 104. A sentiment collector 112 collects sentiment information $200_i$ to capture information relevant to user sentiment the user is expressing in text, using the user communication program 108, sent to the interactive program 110. The user of the user computer 104 creates the text, whose sentiment is gathered, using an input device with 114 with a haptic interface to capture haptic metric values measured from the user manipulating the input device 114 with their hand or other body part, such as depressing mechanical or displayed keys on a keyboard. The measured haptics may include local keyclick feedback for the haptics with respect to one key and global keyclick feedback with respect to all the keys. The captured haptic metric values from the input device 114 may indicate: a pressure/intensity of the keyclick; acceleration value of depressing the keys; area of inference/surface area of key depressed; and frequency between key selections, i.e., speed of typing.

Figures 2, 3, 4, 5, 6:
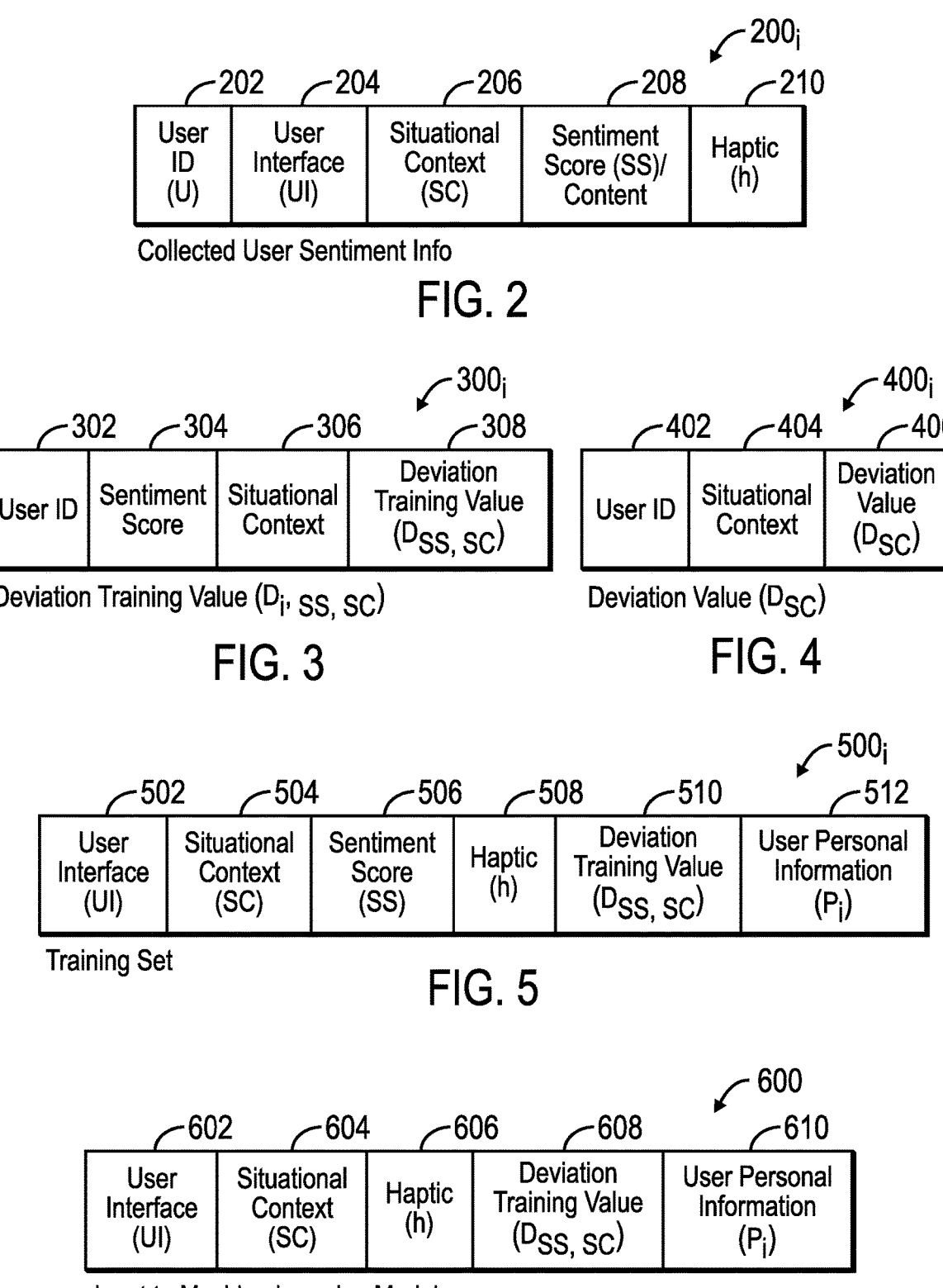
FIG. 2 illustrates an embodiment of collected user sentiment information including haptic information.
FIG. 3 illustrates an embodiment of a deviation training value used as input in training sets to train a sentiment machine learning module.
FIG. 4 illustrates an embodiment of a deviation value used as input to a sentiment machine learning module to determine a sentiment score for determined haptic matric values.
FIG. 5 illustrates an embodiment of a training set of input data to the sentiment machine learning module to train the sentiment machine learning module to output data indicated in the training set.
FIG. 6 illustrates an embodiment of input to the sentiment machine learning module to produce a sentiment score.

Upon receiving approval from the user to allow collection of haptic values, personal user information, and typed text, the sentiment collector 112 packages into collected user sentiment information $200_i$, as shown in FIG. 2, a user identifier (ID) 202; the user interface type 204 or input device type which generated the haptics, e.g., mechanical keyboard, laptop keyboard, mouse, smartphone, etc.; a situational context 206 in which the user created the content using the input device 114, e.g., location and time; the content and/or a sentiment score calculated from the content 208; and the measured haptic metric values (h) 210. The sentiment collector 112 may include or call a sentiment analysis tool using natural language processing (NLP) capabilities to process text and provide a sentiment score, which can be a scale from negative to positive values, multiple discrete values, e.g., positive, neutral, negative, or a percentage score indicating a degree of positive sentiment. If the sentiment collector 112 does not have access to a sentiment analysis tool, then the content 208 of what the user entered with the input device 114 is provided with the collected sentiment information $200_i$ for further analysis.

The sentiment score 208 may comprise one value indicating overall sentiment, e.g., happiness, contentedness, or comprise a vector of values for different sentiment dimensions, e.g., pleasant/unpleasant, excited/calm, etc. The situational context 206 may comprise a single value or a vector of values, including location and time. The haptic metric value 210 may comprise a single haptic measurement, e.g., pressure, or comprise a vector of measurements for different haptic metrics, such as pressure/intensity, area of inference, acceleration, frequency between keystrokes, etc.

The sentiment collector 112 may request user approval and authorization to collect and send sentiment information $200_i$ to the sentiment server 100 to use to determine sentiment to provide to the interactive program 110 to improve the user experience with the interactive program 110 by allowing the interactive program 110 to adjust its communication tone and content based on a user sentiment score. The sentiment collector 112 may continually gather collected sentiment information $200_i$ to send to the sentiment server 100 to train the sentiment machine learning module 116 to better predict user sentiment based on haptic measurements. Providing more accurate sentiment predictors improves user interaction with the interactive program 110 or virtual assistant by allowing the interactive program 110 to, in real-time, respond to changes in user sentiment The interactive program 110 or the user computer 104 may generate collected active sentiment information $200_a$ to send to the sentiment server 100 to determine the user sentiment score in real time to use to adjust the interactive program 110 communication with the user based on their current sentiment.

A profiler builder 118 receives the collected sentiment information $200_i$ from user computers 104. If the received collected sentiment information $200_i$ includes content 208 but not a sentiment score, then a text sentiment analyzer 120 can be called to determine a sentiment score for the content 208. Alternatively, the received collected sentiment information $200_i$ may already include a sentiment score. If the sentiment score 208 for the received content indicates a sentiment score 208 determined with an acceptable confidence level, then the profile builder 118 stores the collected sentiment information $200i$ in the user sentiment database 200 as a user sentiment information instance $200_i$, which is the information that is collected, except it includes a sentiment score 208 from the text sentiment analyzer 120 if the received information included the content of what was typed. If the sentiment score 208 for the received content does not have an acceptable confidence level, then the received sentiment information 200$_i$ may not be saved in the user sentiment database 200 because the haptic metric values are not associated with a valid sentiment score 208, so cannot be used to predict sentiment with confidence. An example of a sentiment analyzer 120 is the sentiment analysis feature provided with the IBM® Watson® Natural Language Understanding product. (IBM and Watson are registered trademarks of International Business Machines Corp. throughout the world).

A deviation generator 122 may generate user deviation training values 300$_i$ and user deviation values 400$_i$ to store in a user deviation database 124. The user deviation training values 300$_i$ indicate a degree to which the user i specific haptics for different sentiment scores and different situational contexts differ from haptics across all users for a sentiment score. The user deviation values 400$_i$ indicate a degree to which the user i specific haptics for different situational contexts differ from haptics across all users. The deviation values 300$_i$ and 400$_i$ allow the sentiment machine learning module 116 to take into account that a specific user has different ground truth or base line haptic values for a given situational context and sentiment score. For instance, some users may regularly type with high pressure more than users in general across all sentiment scores and situational contexts, and the deviation values will take that into account, e.g., this user regularly types with more pressure than the average user or less pressure than the average user.

A training set builder 126 may generate training sets 500$_i$, as shown in FIG. 5, that include the user sentiment information instance fields 200$_i$, with sentiment score 208, a deviation training value D$_{i, \, SS, \, SC}$ 510 for user i for the sentiment score 208 (SS) and situational context (SC) 206 in the sentiment information fields 200$_i$, and user personal information Pi, such as gender, profession, and any other biometric factors predictive of haptics produced for sentiment states from a user personal information database 128. The training sets 500$_i$ are stored in a training set database 500.

A machine learning trainer 130 may periodically access training sets 500$_i$ from the database to use to train the sentiment machine learning module 116 by forming an input set, such as a matrix, of training set input values (UI$_i$, SS$_i$, h$_i$, SC$_i$, D$_{i, \, SS, \, SC}$, P$_i$) and form an output set of the sentiment scores (SS$_i$) from the training sets 500$_i$, such as a vector. The sentiment machine learning module 116 is then trained with the input set to produce the output set of sentiment scores.

To produce a real time sentiment score from collected active sentiment information 200$_a$, a haptic sentiment generator 132 processes the received collected active sentiment information 200$a$, and generates machine learning (ML) input 134 including, from the active sentiment information 200$_a$, the user interface (UI) 204, the situational context 206, the collected haptics 210, a deviation value for the situational context D$_{SC}$ 406 from the user deviation database 124 that is user specific, and personal information P$_i$ from the user personal information database 128. The machine learning input 134 is inputted to the sentiment machine learning module 116 to generate a haptic sentiment score 136, which may be returned to the interactive program 110 to use to control the tone and content of communication with the user of the user computer 104.

In further embodiments, a sentiment score based on the user content generated with the haptic metric values 210 may also be provided as input to the sentiment machine learning module 116 to produce the output sentiment score 136.

The network 106 may comprise a network such as a Storage Area Network (SAN), Local Area Network (LAN), Intranet, the Internet, Wide Area Network (WAN), peer-to-peer network, wireless network, arbitrated loop network, etc.

The arrows shown in FIG. 1 between the components and objects in the sentiment server 100 and user computer 104 represent a data flow between the components.

In certain embodiments, the sentiment machine learning module 116 may use machine learning and deep learning algorithms, such as decision tree learning, association rule learning, neural network, inductive programming logic, support vector machines, Bayesian network, etc. For artificial neural network program implementations, the neural network may be trained using backward propagation to adjust weights and biases at nodes in a hidden layer to produce their output based on the received inputs. In backward propagation used to train a neural network machine learning module, biases at nodes in the hidden layer are adjusted accordingly to produce the sentiment scores having specified confidence levels based on the input parameters. For instance, the ML input 134 to the sentiment machine learning module 116 is processed to produce a haptic sentiment score 136 with a confidence level. The sentiment machine learning module 116 may be trained to produce the haptic sentiment scores 136 based on the inputs from training sets 500$_i$. Backward propagation may comprise an algorithm for supervised learning of artificial neural networks using gradient descent. Given an artificial neural network and an error function, the method may use gradient descent to find the parameters (coefficients) for the nodes in a neural network or function that minimizes a cost function measuring the difference or error between actual and predicted values for different parameters. The parameters are continually adjusted during gradient descent to minimize the error.

In backward propagation used to train a neural network machine learning module, such as the sentiment machine learning module 116, margins of error are determined based on a difference of the calculated predictions and user rankings of the output. Biases (parameters) at nodes in the hidden layer are adjusted accordingly to minimize the margin of error of the error function.

In an alternative embodiment, the sentiment machine learning module 116 may be implemented not as a machine learning module, but implemented using a rules based system to determine the outputs from the inputs. The sentiment machine learning module 116 may further be implemented using an unsupervised machine learning module, or machine learning implemented in methods other than neural networks, such as multivariable linear regression models.

Generally, program modules, such as the program components 108, 110, 112, 116, 118, 120, 122, 126, 130, and 132 may comprise routines, programs, objects, components, logic, data structures, and so on that perform particular tasks or implement particular abstract data types. The program components and hardware devices of the computing devices 100, 102, and 104 of FIG. 1 may be implemented in one or more computer systems, where if they are implemented in multiple computer systems, then the computer systems may communicate over a network.

The program components 108, 110, 112, 116, 118, 120, 122, 126, 130, and 132 may be accessed by a processor from memory to execute. Alternatively, some or all of the program components 108, 110, 112, 116, 118, 120, 122, 126, 130, and 132 may be implemented in separate hardware devices, such as Application Specific Integrated Circuit (ASIC) hardware devices.

The functions described as performed by the program 108, 110, 112, 116, 118, 120, 122, 126, 130, and 132 may be implemented as program code in fewer program modules than shown or implemented as program code throughout a greater number of program modules than shown.

The program components described as implemented in the sentiment server 100, may be implemented in the user computer 104 or the virtual assistant server 102 to determine a sentiment score for active user input.

The user computer 104 may comprise a personal computing device, such as a laptop, desktop computer, tablet, smartphone, etc. The servers 100, 102 may comprise one or more server class computing devices, or other suitable computing devices.

FIG. 3 illustrates an embodiment of deviation training value information 300$_i$, and includes a user ID 302 identifying the user for which the deviation value applies; a sentiment score 304 and situational context 306 for which a deviation training value 308 is calculated. The deviation training value 308 may comprise a ratio of an average of haptic metric values for a user for a given situational context value and sentiment score and average haptic metric values across all users for a sentiment score. In this way, the deviation training value 308 indicates a degree to which a user collected haptic value metrics for a given sentiment score and situational context differ from the average haptic value metrics across all users for a given sentiment score and situational context, which is predictive of the haptic sentiment score 136 for the user haptic metric values 210 in the collected active sentiment 200$_a$. The deviation training value 308 may be included in field 510 of a training set 500$i$ for a user and a given sentiment score and situational context FIG. 4 illustrates an embodiment of information for a calculated deviation value 400$_i$ and includes a user ID 402 identifying the user for which the deviation value applies; and a situational context 404 for which the deviation training value 406 is calculated. The deviation training value 406 may comprise a ratio of an average of haptic metric values for a user for a given situational context value and average haptic metric values across all users. In this way, the deviation training value 308 indicates a degree to which a user collected haptic value metrics for a given situational context differ from the average haptic value metrics across all users, which is predictive of the haptic sentiment score 136 for the user haptic metric values 210 in the collected active sentiment 200$_a$. The deviation value 406 is included in the machine learning input 134 for a user and a given situational context of the collected sentiment 200$_i$.

FIG. 5 illustrates an embodiment of a training set 500$_i$ to provide the information to train the sentiment machine learning module 116, and includes, from the received collected sentiment information 200$_i$: a user interface (UI) 502 comprising user interface 202; a situational context (SC) 504 comprising situational context 206; a sentiment score 504 included in or calculated from information in field 208; haptic metric values 508 from field 210; a deviation training value 510 from the deviation database 124 comprising a calculated deviation training value (D$_{i, SS, SC}$) 308 for a user for a given sentiment score and situational context; and user personal information (P$_i$) 512 for a user from the user personal information database 500.

FIG. 6 illustrates an embodiment of machine learning input 600 to input to the sentiment machine learning module

116 to produce the output haptic sentiment score 136, and includes, from the received collected sentiment information 200$_i$: a user interface (UI) 602 comprising user interface 202; a situational context (SC) 604 comprising situational context 206; haptic metric values 606 from field 210; a user deviation value 608 from the deviation database 124 comprising a calculated deviation value (D$_{i, SC}$) 406 for a user i for a given situational context; and user personal information (P$_i$) 610 for a user from the user personal information database 500.

FIG. 7 illustrates an embodiment of operations performed by the profiler builder 118 to gather user sentiment information 200$_i$ from users at user computers 104 interacting with the interactive program 110. Upon receiving (at block 700) user sentiment information 200$_i$, gathered as part of user authorized information collection gathering operations, the text sentiment analyzer 120 is called (at block 702) to analyze sentiment of content 208 included in the collected user sentiment information 200$i$, if a sentiment score was not included in field 208, but only content, and determine a sentiment score. If (at block 704) a confidence level for the generated sentiment score calculated from the user entered content does satisfy a confidence threshold, i.e., the confidence level indicates the sentiment score is likely accurate, then the user sentiment information 200$_i$ is stored (at block 706) in the user sentiment database 200 with the sentiment score stored in field 208 provided from the sentiment collector 112 or calculated by the text sentiment analyzer 120. This saved information may be used to generate training sets 500$_i$ and determine deviation values 300$_i$, 400$_i$.

If (at block 704) the confidence level of the sentiment score does not exceed a confidence threshold, then the received collected sentiment information 200$_i$ is discarded (at block 708), as the confidence level indicates that the sentiment score is not an accurate predictor of user sentiment and the collected haptic metric values 210 in this situation are not related to a meaningful sentiment score 208. In this way, haptic metric values 210 collected during user input to generate content that do not express an observable sentiment score will not be used to train the sentiment machine learning module 116 as the haptic metric values 210 in this situation do not provide meaningful guidance as to user sentiment.

FIG. 8 illustrates an embodiment of operations performed by the deviation generator 122 to periodically update deviation values 300$_i$, 400$_i$ as new collected sentiment information 200$_i$ for participating users is received. Upon the deviation generator 122 initiating (at block 800) operations to periodically update deviation values 300$_i$, 400$_i$, the deviation generator 122, calculates (at block 802), for each user i, sentiment score (SS), and situational context (SC), a deviation training value (D$_{i, SS, SC}$) 308 for each given sentiment score (SS) and each given situational context (SC) maintained in user sentiment information 200. In one embodiment the deviation training value 308 may be calculated as a ratio of an average of haptic metric values for a given user i, given sentiment score (SS) and given situational context (SC) and average of haptic metric values for the same given sentiment score for all users. Below is one embodiment of equation (1) for the deviation training value 308:

$$D_{i,SS,SC} = \frac{\bar{h}_{i,SS,SC}}{\bar{H}_{SS}}, \tag{1}$$

where $\overline{h}_{i,SS,SC}$ is an average of user i haptic metric values for a given sentiment score (SS) and situational context (SC) from the sentiment information $200_i$ instances for user i, and where $\overline{H}_{SS}$ is an average of haptic metric values for all users for a given sentiment score (SS).

The deviation generator 122 further calculates (at block 804), for each user i and situational context (SC), a deviation value ($D_{i,\ SC}$) 406 for each given situational context (SC) 206 maintained in user sentiment information 200. In one embodiment the deviation value 406 may be calculated as a ratio of average of haptic metric values ($h_i$) 210 for a given user i and given situational context (SC) 206 and average of haptic metric values (H) for all users. Below is one embodiment of equation (2) for the deviation value 406:

$$D_{i,SC} = \frac{\overline{h}_{i,SC}}{\overline{H}}, \qquad (2)$$

where $\overline{h}_{i,SC}$ is an average of user i haptic metric values for a given situational context (SC) from the sentiment information $200_i$ instances for user i, and where $\overline{H}$ is an average of haptic metric values for all users.

The calculated deviation training value information $300_i$ and deviation value information $400_i$ are stored in the deviation database 124 for later use during training or to calculate the sentiment for an active user.

With the embodiment of FIG. 8, the deviation generator 122 calculates how a user's haptic metric values, or measurements, for given sentiment scores and situational contexts relates to the haptic metric values for overall users. Providing this information for different sentiment scores to train the sentiment machine learning module 116 allows the sentiment machine learning module 116 to weight a user's specific typing habits across sentiments with that of users in a community to take into consideration a user's personal haptic range. The haptic metric values may be considered for other features than sentiment score and situational context in determining the deviation training value 308 and deviation value 406. Further, when running the sentiment machine learning module 116 for real time sentiment determinations, a deviation value 406 expresses a user's haptic metric values for a situational context in relation to the haptic metric values across users to have the sentiment machine learning module consider the user's specific differences from the generic average haptic metric values.

FIG. 9 illustrates an embodiment of operations performed by the training set builder 126 to build training sets $500_i$ to store in the training set database 500. The training set builder 126 may be invoked to build training sets $500_i$ in response to receiving user sentiment information $200_i$ or periodically after receiving multiple instances of user sentiment information $200_i$. Upon initiating (at block 900) an operation to create training sets $500_i$ from user sentiment information $200_i$ in the user sentiment database 200, the training set builder 126 generates (at block 902) a training set instance $500_i$ from user sentiment information $200_i$ for user i having in fields 502, 504, 506, 508 the $UI_i$, $SS_i$, $Sc_i$, $h_i$ from fields 204, 206, 208, 210, respectively, in the user sentiment information $200_i$, having personal information PI 512 for user i from the user personal information database 128, and having the user deviation training value $D_{i,SS,SC}$ 308, from the deviation database 124 having a sentiment score (SS) 304 and situational context (SC) 306 matching that information 206 and 208 from the collected user sentiment information $200_i$ stored in field 510. The generated training set instance $500_i$ is stored (at block 904) in the training set database 500.

FIG. 10 illustrates an embodiment of operations performed by the machine learning trainer 130 to train the sentiment machine learning module 116 with the generated training sets $500_i$. Upon initiating (at block 1000) a training operation, the machine learning trainer 130 selects (at block 1002) training set instances $500_i$ to generate a training input set comprising $UI_i$ 502, $SC_i$ 504, $h_i$ 508, $D_{i,SS,SC}$ 510, $P_i$ 512 from selected training set instances $500_i$, in a matrix or matrices, and a training output set comprising the corresponding sentiment scores (SS) 506, which may comprise a vector. The machine learning trainer 130 trains the sentiment machine learning module 116 with the training input set to produce the training output set to update parameter values, biases and weights for the nodes in the sentiment machine learning module 116.

FIG. 11 illustrates an embodiment of operations performed by the haptic sentiment generator 132 to process collected active sentiment information $200_a$ to provide real-time sentiment feedback to the interactive program 110 on the sentiment of the user with which they are interacting via user computer 104. Upon receiving (at block 1100) collected active sentiment information $200_a$, the haptic sentiment generator 132 creates (at block 1102) machine learning (ML) input including in fields 602, 604, and 606 the UI 204, SC 206, and h 210 from the received collected active sentiment information $200_a$, including in field 608 the derivation value 406 for the situational context 206, e.g., field 206 matches field 404, for the user ($D_{SC}$), and including in field 610 the user personal information (Pi) from user personal information database 128. The ML input 600 (UI, h, SC, $D_{SC}$, P) is provided (at block 1104) to the sentiment machine learning module 116 to produce a haptic sentiment score 136. The haptic sentiment score 136 is returned (at block 1106) to the interactive program 110 to control the interactive program 110 to adjust the tone, content, and interaction the interactive program 110 uses to communicate with the active user to optimize the user experience with the interactive program 110.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, defragmentation or garbage collection, but this does not render the storage device as transitory because the data is not transitory while it is stored.

Computing environment 1200 contains an example of an environment for the execution of at least some of the computer code 1201 involved in performing the inventive methods, such as the profile builder 118, text sentiment analyzer 120, deviation generator 122, training set builder 126, machine learning trainer 130, sentiment machine learning module 116, and haptic sentiment generator 132 (FIG. 1).

In addition to block 1201, computing environment 1200 includes, for example, computer 1201, wide area network (WAN) 1202, end user device (EUD) 1203, remote server 1204, public cloud 1205, and private cloud 1206. In this embodiment, computer 1201 includes processor set 1210 (including processing circuitry 1220 and cache 1221), communication fabric 1211, volatile memory 1212, persistent storage 1213 (including operating system 1222 and block 200, as identified above), peripheral device set 1214 (including user interface (UI) device set 1223, storage 1224, and Internet of Things (IoT) sensor set 1225), and network module 1215. Remote server 1204 includes remote database 1230. Public cloud 1205 includes gateway 1240, cloud orchestration module 1241, host physical machine set 1242, virtual machine set 1243, and container set 1244.

COMPUTER 1201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1230. As is well understood in the art of computer technology, and depending upon the technology, performance of a computer-implemented method may be distributed among multiple computers and/or between multiple locations. On the other hand, in this presentation of computing environment 1200, detailed discussion is focused on a single computer, specifically computer 1201, to keep the presentation as simple as possible. Computer 1201 may be located in a cloud, even though it is not shown in a cloud in FIG. 12. On the other hand, computer 1201 is not required to be in a cloud except to any extent as may be affirmatively indicated.

PROCESSOR SET 1210 includes one, or more, computer processors of any type now known or to be developed in the future. Processing circuitry 1220 may be distributed over multiple packages, for example, multiple, coordinated integrated circuit chips. Processing circuitry 1220 may implement multiple processor threads and/or multiple processor cores. Cache 1221 is memory that is located in the processor chip package(s) and is typically used for data or code that should be available for rapid access by the threads or cores running on processor set 1210. Cache memories are typically organized into multiple levels depending upon relative proximity to the processing circuitry. Alternatively, some, or all, of the cache for the processor set may be located "off chip." In some computing environments, processor set 1210 may be designed for working with qubits and performing quantum computing.

Computer readable program instructions are typically loaded onto computer 1201 to cause a series of operational steps to be performed by processor set 1210 of computer 1201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1221 and the other storage media discussed below. The program instructions, and associated data, are accessed by processor set 1210 to control and direct performance of the inventive methods. In computing environment 1200, at least some of the instructions for performing the inventive methods may be stored in block 200 in persistent storage 1213.

COMMUNICATION FABRIC 1211 is the signal conduction path that allows the various components of computer 1201 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1212 is any type of volatile memory now known or to be developed in the future. Examples include dynamic type random access memory (RAM) or static type RAM. Typically, volatile memory 1212 is characterized by random access, but this is not required unless affirmatively indicated. In computer 1201, the volatile memory 1212 is located in a single package and is internal to computer 1201, but, alternatively or additionally, the volatile memory may be distributed over multiple packages and/or located externally with respect to computer 1201.

PERSISTENT STORAGE 1213 is any form of non-volatile storage for computers that is now known or to be developed in the future. The non-volatility of this storage means that the stored data is maintained regardless of whether power is being supplied to computer 1201 and/or directly to persistent storage 1213. Persistent storage 1213 may be a read only memory (ROM), but typically at least a portion of the persistent storage allows writing of data, deletion of data and re-writing of data. Some familiar forms of persistent storage include magnetic disks and solid state storage devices. Operating system 1222 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 1214 includes the set of peripheral devices of computer 1201. Data communication connections between the peripheral devices and the other components of computer 1201 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1223 may include components such as a display screen, speaker, microphone, wearable devices (such as goggles and smart watches), keyboard, mouse, printer, touchpad, game controllers, and haptic devices. Storage 1224 is external storage, such as an external hard drive, or insertable storage, such as an SD card. Storage 1224 may be persistent and/or volatile. In some embodiments, storage 1224 may take the form of a quantum computing storage device for storing data in the form of qubits. In embodiments where computer 1201 is required to have a large amount of storage (for example, where computer 1201 locally stores and manages a large database) then this storage may be provided by peripheral storage devices designed for storing very large amounts of data, such as a storage area network (SAN) that is shared by multiple, geographically distributed computers. IoT sensor set 1225 is made up of sensors that can be used in Internet of Things applications. For example, one sensor may be a thermometer and another sensor may be a motion detector.

NETWORK MODULE 1215 is the collection of computer software, hardware, and firmware that allows computer 1201 to communicate with other computers through WAN 1202. Network module 1215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1215 are performed on the same physical hardware device. In other embodiments (for example, embodiments that utilize software-defined networking (SDN)), the control functions and the forwarding functions of network module 1215 are performed on physically separate devices, such that the control functions manage several different network hardware devices. Computer readable program instructions for performing the inventive methods can typically be downloaded to computer 1201 from an external computer or external storage device through a network adapter card or network interface included in network module 1215.

WAN 1202 is any wide area network (for example, the internet) capable of communicating computer data over non-local distances by any technology for communicating computer data, now known or to be developed in the future. In some embodiments, the WAN 1202 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1203 is any computer system that is used and controlled by an end user (for example, a customer of an enterprise that operates computer 1201), and may take any of the forms discussed above in connection with computer 1201. EUD 1203 typically receives helpful and useful data from the operations of computer 1201. For example, in a hypothetical case where computer 1201 is designed to provide a recommendation to an end user, this recommendation would typically be communicated from network module 1215 of computer 1201 through WAN 1202 to EUD 1203. In this way, EUD 1203 can display, or otherwise present, the recommendation to an end user. In some embodiments, EUD 1203 may be a client device, such as thin client, heavy client, mainframe computer, desktop computer and so on.

REMOTE SERVER 1204 is any computer system that serves at least some data and/or functionality to computer 1201. Remote server 1204 may be controlled and used by the same entity that operates computer 1201. Remote server 1204 represents the machine(s) that collect and store helpful and useful data for use by other computers, such as computer 1201. For example, in a hypothetical case where computer 1201 is designed and programmed to provide a recommendation based on historical data, then this historical data may be provided to computer 1201 from remote database 1230 of remote server 1204.

PUBLIC CLOUD 1205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1205 is performed by the computer hardware and/or software of cloud orchestration module 1241. The computing resources provided by public cloud 1205 are typically implemented by virtual computing environments that run on various computers making up the computers of host physical machine set 1242, which is the universe of physical computers in and/or available to public cloud 1205. The virtual computing environments (VCEs) typically take the form of virtual machines from virtual machine set 1243 and/or containers from container set 1244. It is understood that these VCEs may be stored as images and may be transferred among and between the various physical machine hosts, either as images or after instantiation of the VCE. Cloud orchestration module 1241 manages the transfer and storage of images, deploys new instantiations of VCEs and manages active instantiations of VCE deployments. Gateway 1240 is the collection of computer software, hardware, and firmware that allows public cloud 1205 to communicate through WAN 1202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1206 is similar to public cloud 1205, except that the computing resources are only available for use by a single enterprise. While private cloud 1206 is depicted as being in communication with WAN 1202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1205 and private cloud 1206 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for determining a sentiment score for content generated by a user using an input device and communicating with bot, the computer program product comprising a computer readable storage medium having computer readable program code embodied therein that is executable to perform operations, the operations comprising:

receiving haptic metric values collected from haptic interfaces embedded in input devices users are controlling to generate text content, wherein the haptic metric values are measured from the users manipulating the input devices with a body part, wherein the haptic metric values are selected from the group consisting of a pressure of a keyclick on the input devices, an acceleration value of depressing keys on the input devices, surface area of keys depressed, frequency between key selections;

receiving a sentiment score indicating a sentiment of the text content, from one of the input devices, from a sentiment analysis of the text content;

forming training sets, wherein a training set associates at least one of the haptic metric values and the sentiment score for the text content produced by the one of the input devices when the at least one of the haptic metric values was measured from the one of the input devices;

for a selected training set of the training sets, training a sentiment machine learning module to output the sentiment score in the selected training set from input comprising the at least one of the haptic metric values;

inputting a haptic metric value received from an input device used by an active user interacting with the bot to the sentiment machine learning module to output a haptic sentiment score for the inputted haptic metric value; and providing the haptic sentiment score to the bot to control a tone and content the bot presents to the active user based on the haptic sentiment score.

2. The computer program product of claim 1, wherein the operations further comprise:

determining whether a confidence level for a sentiment score for text content generated when a received haptic metric value was measured exceeds a confidence level threshold, wherein the received haptic metric value is only included in a training set with the sentiment score in response to determining that the confidence level for the sentiment score exceeds the confidence level threshold.

3. The computer program product of claim 1, wherein the bot comprises a virtual assistant and wherein the haptic sentiment score comprises a vector indicating multiple sentiment scores for multiple sentiment attributes, wherein the haptic sentiment score controls a tone the virtual assistant generates when interacting with the user.

4. The computer program product of claim 1, wherein the operations further comprise:

collecting situational context values determined when the haptic metric values were generated, wherein the selected training set includes a situational context value for the at least one of the haptic metric values, wherein the sentiment machine learning module is trained with the situational context value in the selected training set along with the at least one of the haptic metric values to output the haptic sentiment score, and wherein input to the sentiment machine learning module from the active user includes an input situational context value for the inputted haptic metric value.

5. The computer program product of claim 4, wherein the input situational context value comprises a vector indicating a location and time when the input haptic metric value was generated, and wherein the input haptic metric value comprises a vector indicating control touched, pressure of touch, frequency between touches, and area of inference.

6. The computer program product of claim 1, wherein the training set further associates a deviation training value indicating an extent to which haptic metric values measured for the user for the sentiment score differ from haptic metric values measured for the sentiment score across a plurality of users, wherein input to train the sentiment machine learning module from the selected training set further comprises a deviation training value in the selected training set, and wherein the input to the sentiment machine learning module for the active user further comprises a deviation training value for the active user.

7. The computer program product of claim 6, wherein the operations further comprise:

determining deviation training values for a user for different sentiment scores, wherein a deviation training value for a given sentiment score of the different sentiment scores for the user is calculated as a ratio of haptic values for the given sentiment score for the user and haptic values for the given sentiment score from the plurality of users, wherein the deviation training value included in a training set for the sentiment score is from the deviation values determined for the user.

8. The computer program product of claim 6, wherein the training set includes personal attributes of the user for which the at least one of the haptic metric values was determined, wherein the sentiment machine learning module is trained with the personal attributes for the user in the selected training set along with the at least one of the haptic metric values and the deviation training value for the user to output the sentiment score, and wherein the input to the sentiment machine learning module from the active user further includes personal attributes of the active user.

9. The computer program product of claim 1, wherein the operations further comprise:

collecting situational context values determined when the haptic metric values were generated, wherein the training set includes a situational context value for a haptic metric value, wherein the sentiment machine learning module is trained with the situational context value in the selected training set along with the haptic metric value to output the haptic sentiment score, and wherein input to the sentiment machine learning module from the active user includes a situational context value for the haptic metric value;

determining deviation training values for a user for different sentiment scores and situational context values experienced by the user when the haptic metric values were generated, wherein a deviation training value for a given sentiment score of the different sentiment scores and a given situational context value is based on haptic values for the given sentiment score and the given situational context value for the user and haptic values for the given sentiment score from a plurality of users, wherein a deviation training value included in a training set for the sentiment score and the situational context value is from the deviation training value for the situational context value in which the haptic metric value was measured; and determining deviation training values for different situational context values for the user, wherein the deviation training value inputted to the sentiment machine learning module for the active user is for a situational context value for the active user.

10. The computer program product of claim 9, wherein the operations further comprise:

wherein a deviation training value for a user for a given sentiment score and a given situation context value is calculated as ratio of (an average of haptic values for the given sentiment score and the given situational context value for the user) and (an average of haptic values for the given sentiment score from the plurality of users), and wherein a deviation training value for a user for a given situational context value is calculated as a ratio of (an average of haptic values for the given situational context value for the user) and (an average of haptic values from the plurality of users).

11. The computer program product of claim 1, wherein haptic metric values are collected from different input devices, wherein the training set indicates an input device from which the at least one of the haptic metric values was generated, and wherein input to the sentiment machine learning module from the user interacting with the bot includes an input device used by the user interacting with the bot when the haptic metric value was inputted.

12. A system for determining a sentiment score for content generated by a user using an input device and communicating with a bot, comprising:

a processor; and a computer readable storage medium having computer readable program code embodied therein that when executed by the processor performs operations, the operations comprising:

receiving haptic metric values collected from haptic interfaces embedded in input devices users are controlling to generate text content, wherein the haptic metric values are measured from the users manipulating the input devices with a body part, wherein the haptic metric values are selected from the group consisting of a pressure of a keyclick on the input devices, an acceleration value of depressing keys on the input devices, surface area of keys depressed, frequency between key selections;

receiving a sentiment score indicating a sentiment of the text content, from one of the input devices, from a sentiment analysis of the text content;

forming training sets, wherein a training set associates at least one of the haptic metric values and the sentiment score for the text content produced by the one of the input devices when the at least one of the haptic metric values was measured from the one of the input devices;

for a selected training set of the training sets, training a sentiment machine learning module to output the sentiment score in the selected training set from input comprising the at least one of the haptic metric values;

inputting a haptic metric value received from an input device used by an active user interacting with the bot to the sentiment machine learning module to output a haptic sentiment score for the inputted haptic metric value; and providing the haptic sentiment score to the bot to control a tone and content the bot presents to the active user based on the haptic sentiment score.

13. The system of claim 12, wherein the bot comprises a virtual assistant and wherein the haptic sentiment score comprises a vector indicating multiple sentiment scores for multiple sentiment attributes, wherein the haptic sentiment score controls a tone the virtual assistant generates when interacting with the user.

14. The system of claim 12, wherein the operations further comprise:

collecting situational context values determined when the haptic metric values were generated, wherein the training set includes a situational context value for a haptic metric value, wherein the sentiment machine learning module is trained with the situational context value in the selected training set along with the haptic metric value to output the haptic sentiment score, and wherein input to the sentiment machine learning module from the active user includes a situational context value for the haptic metric value.

15. The system of claim 12, wherein the training set further associates a deviation training value indicating an extent to which haptic metric values measured for the user for the sentiment score differ from haptic metric values measured for the sentiment score across a plurality of users, wherein input to train the sentiment machine learning module from the selected training set further comprises a deviation training value in the selected training set, and wherein the input to the sentiment machine learning module for the active user further comprises a deviation training value for the active user.

16. The system of claim 12, wherein the operations further comprise:

collecting situational context values determined when the haptic metric values were generated, wherein the training set includes a situational context value for a haptic metric value, wherein the sentiment machine learning module is trained with the situational context value in the selected training set along with the haptic metric value to output the haptic sentiment score, and wherein input to the sentiment machine learning module from the active user includes a situational context value for the haptic metric value;

determining deviation training values for a user for different sentiment scores and situational context values experienced by the user when the haptic metric values were generated, wherein a deviation training value for a given sentiment score of the different sentiment scores and a given situational context value is based on haptic values for the given sentiment score and the given situational context value for the user and haptic values for the given sentiment score from a plurality of users, wherein a deviation training value included in a training set for the sentiment score and the situational context value is from the deviation training value for the situational context value in which the haptic metric value was measured; and determining deviation training values for different situational context values for the user, wherein the deviation training value inputted to the sentiment machine learning module for the active user is for a situational context value for the active user.

17. A computer implemented method for determining a sentiment score for content, comprising:

receiving haptic metric values collected from haptic interfaces embedded in input devices users are controlling to generate text content, wherein the haptic metric values are measured from the users manipulating the input devices with a body part, wherein the haptic metric values are selected from the group consisting of a pressure of a keyclick on the input devices, an acceleration value of depressing keys on the input devices, surface area of keys depressed, frequency between key selections;

receiving a sentiment score indicating a sentiment of the text content, from one of the input devices, from a sentiment analysis of the text content;

forming training sets, wherein a training set associates at least one of the haptic metric values and the sentiment score for the text content produced by the one of the input devices when the at least one of the haptic metric values was measured from the one of the input devices;

for a selected training set of the training sets, training a sentiment machine learning module to output the sentiment score in the selected training set from input comprising the at least one of the haptic metric values;

inputting a haptic metric value received from an input device used by an active user interacting with a bot to the sentiment machine learning module to output a haptic sentiment score for the inputted haptic metric value; and providing the haptic sentiment score to the bot to control a tone and content the bot presents to the active user based on the haptic sentiment score.

18. The method of claim 17, wherein the bot comprises a virtual assistant and wherein the haptic sentiment score comprises a vector indicating multiple sentiment scores for multiple sentiment attributes, wherein the haptic sentiment score controls a tone the virtual assistant generates when interacting with the user.

19. The method of claim 17, further comprising:

collecting situational context values determined when the haptic metric values were generated, wherein the training set includes a situational context value for a haptic metric value, wherein the sentiment machine learning module is trained with the situational context value in the selected training set along with the haptic metric value to output the haptic sentiment score, and wherein input to the sentiment machine learning module from the active user includes a situational context value for the haptic metric value.

20. The method of claim 17, wherein the training set further associates a deviation training value indicating an extent to which haptic metric values measured for the user for the sentiment score differ from haptic metric values measured for the sentiment score across a plurality of users, wherein input to train the sentiment machine learning module from the selected training set further comprises a deviation training value in the selected training set, and wherein the input to the sentiment machine learning module for the active user further comprises a deviation training value for the active user.

* * * * *